Sept. 23, 1958     C. REIMANN     2,853,262
PIVOTED HOSE DEVICE
Filed Feb. 9, 1956
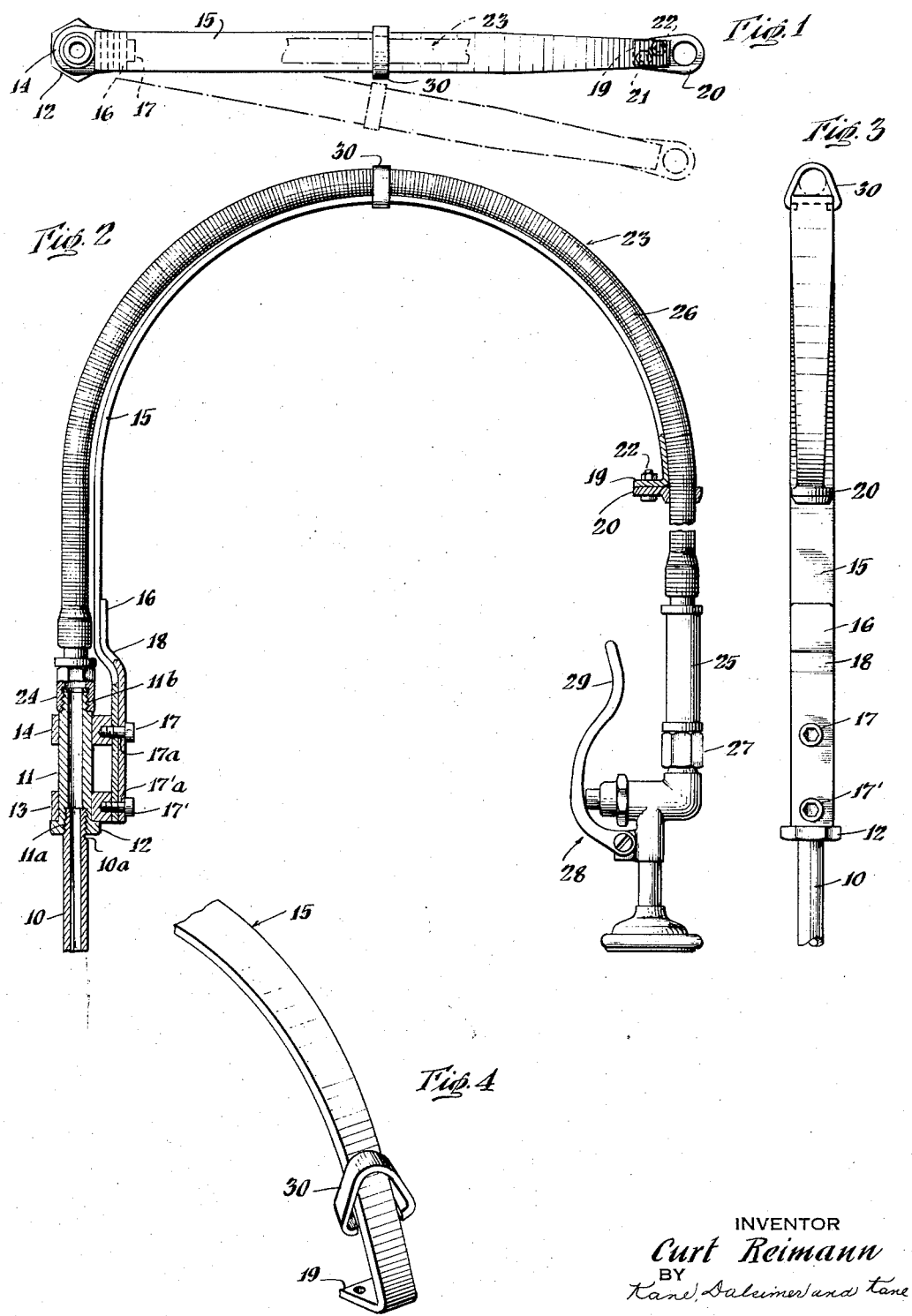
INVENTOR
*Curt Reimann*
BY
*Kane, Dalsimer and Kane*
ATTORNEYS United States Patent Office 2,853,262
Patented Sept. 23, 1958

2,853,262
PIVOTED HOSE DEVICE

Curt Reimann, Springfield Gardens, N. Y., assignor to T & S Brass & Bronze Works, Inc., New Cassel, N. Y., a corporation of New York Application February 9, 1956, Serial No. 564,403

5 Claims. (Cl. 248—75)

This invention relates generally to supporting devices and more particularly to a pivoted spring device which is used to support a hose extended from a water spigot.

In certain occupations, it is necessary during the course of the work to apply water or other liquid to objects such as dishes in order to cleanse them. To accomplish this, it is often necessary to attach an extension hose to the water spigot in order that a spray may be brought into the vicinity of the objects to be washed. This extension must, for proper use, be immediately available when the operator desires to use it and easily removed from the immediate vicinity of the objects after the user has completed the spraying operation. Also the extension, when not in use, must be maintained in such a position that it will not obstruct other activities. The extension hose used therefore must be flexible so that its spray end can be used within a large area and the mounting must be such that the hose will not become worn by continual use.

The invention herein disclosed has, as its principal object the provision of a device which will support an extension hose connected to a water spigot in such a manner that the flexibility of the extension can be utilized to the fullest over a wide area.

Another object of the present invention is to provide a support for an extension hose which will transmit stress applied to the spray end of the extension immediately to the spigot in such a manner that the hose will not be unduly stressed during use.

A further object of this invention is the provision of a device which will support a spigot extension in such a manner that the extension will not obstruct other activities and which will permit the spray end of the extension to be easily brought into the vicinity of the objects to be sprayed.

Still another object of the invention is to provide a pivoted spring support device which is of simple construction and has relatively few parts so that it may be manufactured inexpensively.

These and other objects are accomplished by furnishing a mounting for the extension hose which is resilient so that it can move radially in a plane passed through it and is pivotally mounted for rotational movement so that it can adequately support an extension hose in such a manner that the flexibility of the hose can be utilized. The construction of the pivoted spring support and manner of using the same is described herein with reference to the drawings in which:

Fig. 1 is a plan view of a pivoted spring support device embodying this invention and a phantom view is shown of the device rotated slightly to one side about its pivot;

Fig. 2 is a partial sectional side view of the supporting device shown in Fig. 1 with an extension hose and hand operated spray disposed thereon and supported by the support device;

Fig. 3 is a front view of the support device shown in Figs. 1 and 2 showing in detail the tapered width of the forward portion of the arcuate member, and Fig. 4 is a sectional view of the forward portion of the arcuate member.

As shown in Fig. 2, the numeral 10 designates the end of a pipe which has had the spigot removed therefrom. One end of pipe 10 is externally threaded at 10a. Cylindrical member 11 which is internally threaded at one end at 11a and externally threaded at the other end at 11b is attached to pipe 10 by the interlocking of threads 11a with threads 10a. Member 11 can be constructed of any pipe material such as brass or copper.

Flange 12 is formed at the lower end of member 11 whereat pipe 10 is interlocked therewith. It is preferred that this flange be formed as an integral part of member 11, however, it can be a separate member rigidly attached thereto. As shown in the figures, flange 12 has been given a hexagonal shape in order to facilitate the use of tooling when the pipes are connected together but the flange can be of any shape.

Clamps 13 and 14 having cylindrical openings therein serve as mounting members whereby arcuate member 15 is mounted on member 11. The cross-sectional diameters of the openings in clamps 13 and 14 are slightly greater than the external diameter of member 11, and clamps 13 and 14 are rotatably mounted on member 11 forming a pivotal connection for arcuate member 15 which is attached to clamps 13 and 14 by screws 17 and 17' passing through holes 17a and 17'a in arcuate member 15.

It will be noted by observance of Fig. 2 that clamps 13 and 14 are attached to member 15 in spaced relationship to each other so that the lower edge of clamp 13 is adjacent the upper edge of flange 12, and clamp 14 encompasses member 11 close to the other end thereof. Such a mounting enables flange 12 to prevent relative movement, due to the force of gravity, of arcuate member 15 and member 11 in a direction longitudinal to the axis of member 11 while allowing rotational movement of member 15 about the longitudinal axis of member 11.

Arcuate member 15 is constructed of spring steel, spring brass or any other spring material of rectangular cross section and is supported at its mountings by bracket member 16. Arcuate member 15 and bracket member 16 are of equal width and both are detented slightly outwardly in a radial direction at 18, the purpose of which will be explained below. Since member 15 is a single steel piece and rectangular in cross sectdion, it can be made very resilient for movement radially in a plane passed through the arc and yet will not be resilient in a sidewise direction thereby eliminating "snapping" or "whipping" movement. Arcuate member 15 can be rotated easily, however, due to its pivotal mounting in order to alter the direction of radial movement.

Arcuate member 15 is of constant width throughout its length except for a portion near the forward end thereof which gradually decreases in width forming a transverse taper thereon. The extreme forward tip 19 of arcuate member 15 is folded inwardly forming an angle with the arcuate member.

Clamp 20 which is constructed of brass or any other rugged material is rigidly connected to tip 19 by screws 21 and 22. This clamp has a circular opening disposed therein lying parallel to the plane of tip 19 and at an angle to arcuate member 15.

The extension hose designated in Fig. 2 generally as 23 is attached at one of its ends to member 11 by threading the threads 11b into internally threaded member 24 to which the end of the hose is connected by a press fit or any other suitable attachment. This end of hose 23 is held by member 24 adjacent arcuate member 15 and concentric with member 11. It is for this reason that detent 18 is placed in arcuate member 15 and bracket 16.

A rubber or plastic hose which is not shown in the figures extends longitudinally through member 24 and out of its other end. This hose is entirely surrounded by flexible metal cabling 26, which serves to protect it. Cable 26 is attached at one of its ends to member 24 and its other end terminates at grip 25 and nut 27 which fastens spray 28 thereon. Spray 28 is any conventional spray device and is shown in Fig. 2 with a handle 29 which must be depressed if it is desired that water from pipe 10 be emitted from the spray.

Grip 25 is a cylindrical member constructed of metal, plastic or the like and is rigidly connected to nut 27 in order that an operator may more easily use spray 28. Grip 25 like member 24 is attached to hose 23 in any suitable manner and is attached to nut 27 by a press fit, threading etc.

Cable 26 extends through the circular opening in clamp 20 and is adjacent arcuate member 15 throughout the length of that member. Clip 30 maintains cable 26 in position adjacent to and on top of arcuate member 15, which thereby serves as a support for cable 26. Clip 30 is placed in position by insertion at the forward end of arcuate member 15 with cable 26 interposed between it and member 15. Since arcuate member 15 is tapered, at its forward end, clip 30 which is slidably mounted thereon will be easily slid toward the center portion of arcuate member 15. In this position clip 30 firmly grasps either side of arcuate member 15 and snugly embraces cable 26 thereto. Although clip 30 is shown in the figures as a slidable member, it may be spring-pressed or any other type.

In use an operator desiring to emit a spray of water on an object grasps spray portion 28 at handle 29 and brings the spray portion into the vicinity of the object. In order to accomplish this, cable 26 which is held in position on arcuate member 15 by clamp 20 will transmit stress applied to it and spray 28 by means of clamp 20 to arcuate member 15. The stress applied to member 15 will then be transmitted to mounting clamps 13 and 14 thereby pivoting arcuate member 15 so that it points in the direction of use. Also since arcuate member 15 is resilient, the radius of curvature will be changed by force applied at clamp 20 perpendicular to member 15, thereby utilizing to the fullest the flexibility of the hose extension over a wide area.

Therefore, it is seen that a new and revolutionary supporting device is provided. The device herein described will maintain an extension hose in such a manner that the extension will not obstruct activities in the area surrounding it, yet will be available for immediate use when it is desired. This unique support will increase the life of an extension hose since the forces applied to the hose in order to maneuver it will be transmitted immediately to the support device, which will then transmit these forces to the spigot thereby eliminating excessive wear of the extension hose.

Thus, among others, the several objects in the invention as specifically aforenoted are achieved. Obviously, numerous changes in construction and arrangement of the parts might be resorted to without departing from the spirit of the invention as defined by the claims.

I claim:

1. A hose device comprising in combination a flexible hose, a hollow cylindrical member, an end of said cylindrical member to which said hose is connected for fluid conduction, a fluid conducting pipe, a second end of said cylindrical member connected to said pipe for fluid conduction, an arcuate member pivotally connected to said cylindrical member for rotational movement about the axis of said cylindrical member, a supporting surface of said arcuate member and means constructed and arranged to maintain said hose adjacent said supporting surface.

2. A hose device in accordance with claim 1 in which the arcuate member is resiliently movable solely in the plane in which the arcuate member is contained.

3. A hose device comprising in combination a flexible hose, a hollow cylindrical member, an end of said cylindrical member to which said hose is connected for fluid conduction, a fluid conducting pipe, a second end of said cylindrical member connected to said pipe for fluid conduction, an arcuate member pivotally connected to said cylindrical member for rotational movement about the axis of said cylindrical member, a supporting surface of said arcuate member and means constructed and arranged to maintain said hose throughout a major portion of its length adjacent said supporting surface.

4. A hose device in accordance with claim 3 in which the arcuate member is resiliently movable solely in the plane in which the arcuate member is contained.

5. A hose device comprising in combination a flexible hose, a hollow cylindrical member, an end of said cylindrical member to which said hose is connected for fluid conduction, a fluid conducting pipe, a second end of said cylindrical member having a threaded portion attached to said pipe, an outwardly extending flange on said cylindrical member adjacent the end to which said pipe is attached, a clamp rotatably mounted on said cylindrical member, said flange limiting longitudinal movement of said clamp on said cylindrical member toward said fluid conducting pipe, an arcuate member rigidly attached at one of its ends to said clamp, said arcuate member being resiliently movable solely in the plane in which the arcuate member is contained, a supporting surface of said arcuate member and means constructed and arranged to maintain said hose throughout a major portion of its length adjacent said supporting surface.

References Cited in the file of this patent

UNITED STATES PATENTS

| 1,371,981 | Rose | Mar. 15, 1921 |
| 2,049,410 | Diehl | July 28, 1936 |
| 2,191,011 | Dorman | Feb. 20, 1940 |
| 2,194,224 | Hauck | Mar. 19, 1940 |
| 2,748,236 | Landis et al. | May 29, 1956 |

FOREIGN PATENTS

| 611,878 | Great Britain | Nov. 4, 1948 |